United States Patent
Tsai et al.

(10) Patent No.: US 9,564,984 B1
(45) Date of Patent: Feb. 7, 2017

(54) PORTABLE ELECTRONIC DEVICE

(71) Applicant: HTC Corporation, Taoyuan (TW)

(72) Inventors: Tiao-Hsing Tsai, Taoyuan (TW);
Chien-Pin Chiu, Taoyuan (TW);
Hsiao-Wei Wu, Taoyuan (TW);
Yi-Hsiang Kung, Taoyuan (TW);
Li-Yuan Fang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/874,478

(22) Filed: Oct. 5, 2015

(51) Int. Cl.
*H04B 1/38* (2015.01)
*H04B 1/16* (2006.01)
*H04K 3/00* (2006.01)
*H04M 1/02* (2006.01)

(52) U.S. Cl.
CPC ........ *H04K 3/62* (2013.01); *H04K 3/68* (2013.01); *H04M 1/0262* (2013.01)

(58) Field of Classification Search
CPC .................................................. H04M 1/0262
USPC ................... 455/574, 571, 1, 343.1
See application file for complete search history.

(56) References Cited

U.S. PATENT DOCUMENTS

| | | | | |
|---|---|---|---|---|
| 5,583,742 A | * | 12/1996 | Noda et al. | G06F 1/1626 248/632 |
| 6,459,890 B1 | * | 10/2002 | Kim | G04G 17/00 368/204 |
| 6,678,532 B1 | * | 1/2004 | Mizoguchi | H01Q 1/241 343/702 |
| 9,270,795 B2 | * | 2/2016 | Endo | H01Q 1/243 |
| 2010/0061040 A1 | * | 3/2010 | Dabov | G06F 1/1626 361/679.01 |
| 2010/0210318 A1 | * | 8/2010 | Zhu | H01M 10/4257 455/572 |
| 2011/0278301 A1 | * | 11/2011 | Sasamori | H04M 1/0262 220/378 |
| 2012/0231638 A1 | * | 9/2012 | Ikeda | H01M 2/206 439/77 |

FOREIGN PATENT DOCUMENTS

| | | |
|---|---|---|
| CN | 101752603 | 6/2010 |
| CN | 102467085 | 10/2014 |
| TW | 201236274 | 9/2012 |

OTHER PUBLICATIONS

"Office Action of Taiwan Counterpart Application", issued on Nov. 9, 2016, p. 1-p. 4.

* cited by examiner

*Primary Examiner* — Tilahun B Gesesse
(74) *Attorney, Agent, or Firm* — Jianq Chyun IP Office

(57) ABSTRACT

A portable electronic device including a battery, a metal element, a control circuit and a plurality of impedance elements is provided. The battery is disposed in a carrier. The metal element receives a feeding signal through a feeding point to generate at least one radio-frequency signal. An orthogonal projection of the metal element on the carrier is overlapped with an orthogonal projection of the battery on the carrier. The control circuit is configured to control the battery so that a plurality of operation signals are transmitted between the battery and the control circuit. The plurality of impedance elements are electrically connected between the battery and the control circuit, and the plurality of impedance elements transmit the plurality of operation signals and block the at least one radio-frequency signal.

12 Claims, 2 Drawing Sheets

PORTABLE ELECTRONIC DEVICE

BACKGROUND OF THE INVENTION

Field of the Invention

The invention relates to an electronic device, and more particularly, to a portable electronic device.

Description of Related Art

In recent years, various types of portable electronic devices have been developed rapidly. For instance, in addition to smart phones, smart bracelets or smart watches also attract people's attention gradually and become new popular products on the market. However, the smart bracelets and the smart watches are much smaller in size as compared to the smart phones, resulting in further limitation to the space for disposing an antenna element in the portable electronic devices. Further, because the smart bracelets and the smart watches are closer to human body in use, a radiation characteristic of the antenna element may be influenced. Accordingly, it has become an important issue for designing the portable electronic device as how to dispose the antenna element in the limited space while maintaining the radiation characteristic of the antenna element.

SUMMARY OF THE INVENTION

The invention is directed to a portable electronic device capable of reducing hardware space consumed by a metal element and maintaining a radiation characteristic of the metal element.

A portable electronic device of the invention includes a battery, a metal element, a control circuit and a plurality of impedance elements. The battery is disposed in a carrier. The metal element receives a feeding signal through a feeding point to generate at least one radio-frequency signal. Further, the orthogonal projection of the metal element on the carrier is overlapped with the orthogonal projection of the battery on the carrier. The control circuit is configured to control the battery so that a plurality of operation signals are transmitted between the battery and the control circuit. The plurality of impedance elements are electrically connected between the battery and the control circuit, and the plurality of impedance elements transmit the plurality of operation signals and block the at least one radio-frequency signal.

In an embodiment of the invention, the battery includes a connector. The connector has a plurality of terminals. Further, the terminals are corresponding to the impedance elements in one-to-one manner, and each of the terminals is electrically connected to the control circuit through the corresponding impedance element.

Based on the above, multiple impedance elements are disposed between the control circuit and the battery in the portable electronic device of the invention. Further, the orthogonal projection of the metal element on the carrier is overlapped with the orthogonal projection of the battery on the carrier. Accordingly, the hardware space consumed by the metal element may be reduced, and the metal element can have the good radiation characteristic.

To make the above features and advantages of the present disclosure more comprehensible, several embodiments accompanied with drawings are described in detail as follows.

DESCRIPTION OF THE EMBODIMENTS

Figure 1:
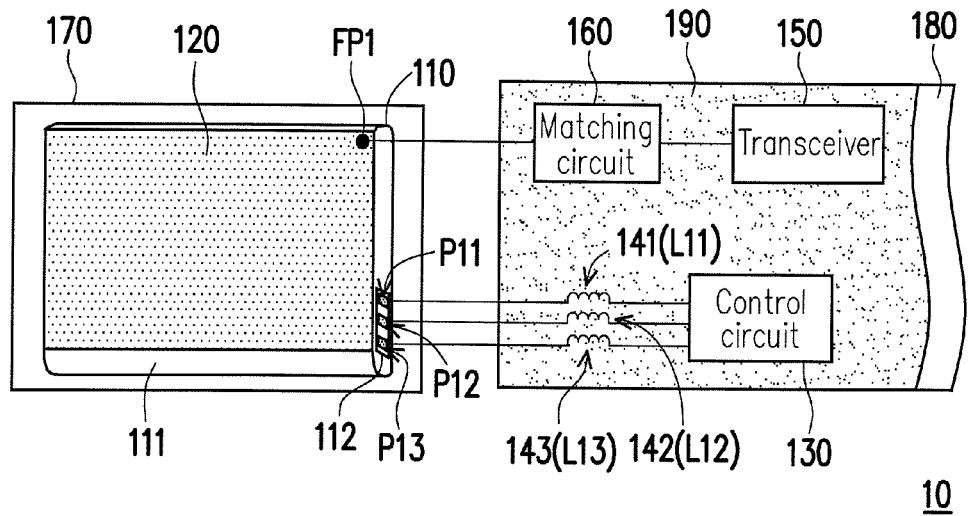
FIG. 1 is a schematic diagram of a portable electronic device according to an embodiment of the invention.

FIG. 1 is a schematic diagram of a portable electronic device according to an embodiment of the invention. As shown in FIG. 1, a portable electronic device 10 includes a battery 110, a metal element 120, a control circuit 130, a plurality of impedance elements (e.g., impedance elements 141 to 143), a transceiver 150, a matching circuit 160, a carrier 170 and a substrate 180. The control circuit 130, the plurality of impedance elements, the transceiver 150 and the matching circuit 160 are disposed on the substrate 180, and a ground plane 190 is further disposed on the substrate 180.

The battery 110 is disposed in the carrier 170, and an orthogonal projection the metal element 120 on the carrier 170 is overlapped with an orthogonal projection of the battery 110 on the carrier 170. For instance, the battery 110 includes a housing 111. Further, the metal element 120 may be, for example, a part of the housing 111, or the metal element 120 may be attached on the housing 111. In other words, the metal element 120 may be considered as a metal surface of the battery 110, so as to facilitate reducing the hardware space consumed by the metal element 120. Further, in an embodiment, the battery 110 can dissipate heat through the metal element 120. For example, the heat energy from the battery 110 may be delivered to the air through the metal element 120. In other words, the metal element 120 may also serve as a heat dissipation element of the battery 110.

More specifically, the battery 110 includes a connector 112, and the connector 112 has a plurality of terminals. For the convenience of the description, only three terminals P11 to P13 in the connector 112 are illustrated in FIG. 1, but the invention is not limited thereto. Further, the connector 112 may be used to transmit a plurality of operation signals between the battery 110 and the control circuit 130. For instance, the operation signals may include a power signal, a ground signal and a battery identification signal generated by the battery 110, and the operation signals may also include power control signals generated by the control circuit 130.

Furthermore, each of the terminals of the connector 112 is electrically connected to the control circuit 130 through one of the impedance elements. Namely, the terminals in the connector 112 are corresponding to the impedance elements in one-to-one manner, and each of the terminals is electrically connected to the control circuit 130 through the corresponding impedance element. For instance, the impedance element 141 is electrically connected between the terminal P11 of the connector 112 and the control circuit 130, the impedance element 142 is electrically connected between the terminal P12 of the connector 112 and the control circuit 130, and the impedance element 143 is electrically connected between the terminal P13 of the connector 112 and the control circuit 130. In other words, the impedance elements 141 to 143 are electrically connected between the battery 110 and the control circuit 130.

In terms of operation, the transceiver 150 can generate a feeding signal, and the metal element 120 can receive the feeding signal from the transceiver 150 through a feeding point FP1. Accordingly, under the excitation of the feeding signal, the metal element 120 can generate at least one radio-frequency signal. Further, the matching circuit 160 is electrically connected between the metal element 120 and the transceiver 150 so that an impedance of the metal element 120 matches an impedance of the transceiver 120. Accordingly, a radiation characteristic of the metal element 120 may be further enhanced by the matching circuit 160, so as to facilitate improving a reception quality of the portable electronic device 10. It should be noted that, persons of ordinary skill in the art can selectively remove the matching circuit 160 based on design requirements.

On the other hand, impedances of the impedance elements 141 to 143 are proportional to the frequency of the signal. Namely, the impedance elements 141 to 143 act as a short circuit at low frequency, and the impedance elements 141 to 143 act as an open circuit at high frequency. In an embodiment, the impedance elements 141 to 143 may be composed of inductors L11 to L13. In other words, the impedance elements 141 to 143 may be used to transmit low frequency signals, such as the operation signals between the battery 110 and the control circuit 130. Further, the impedance elements 141 to 143 may also be used to block high frequency signals, such as the at least one radio-frequency signal generated by the metal element 120. Accordingly, by disposing the impedance elements, the metal element 120 may be prevented from being affected by the battery 110, and the operations between the battery 110 and the control circuit 130 may be performed normally.

Figure 2:
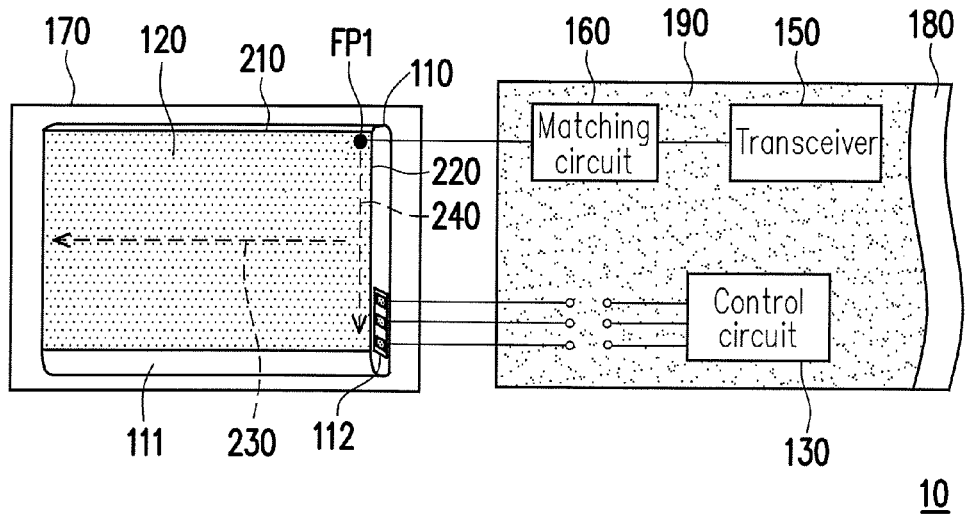
FIG. 2 is a schematic diagram for illustrating operations of the metal element according to an embodiment of the invention.

For instance, FIG. 2 is a schematic diagram for illustrating operations of the metal element according to an embodiment of the invention. As shown in FIG. 2, for the high frequency signals, the impedance elements 141 to 143 act as the open-circuit, such that the metal element 120 may be prevented from being influenced by the battery 110. Further, a monopole antenna structure may be formed by the metal element 120 and the ground plane 190 on the substrate 180. For instance, a shape of the metal element 120 may be, for example, a rectangle, which includes a first edge 210 and a second edge 220 adjacent to each other. In addition, the feeding point FP1 of the metal element 120 is adjacent to an intersection of the first edge 210 and the second edge 220. Accordingly, a first resonant path 230 and a second resonant path 240 may be formed by the metal element 120.

Under the excitation of the feeding signal, the metal element 120 can generate a first resonant mode through the first resonant path 230, so as to receive or transmit a first radio-frequency signal in a first band. Further, the metal element 120 can also generate a second resonant mode through the second resonant path 240, so as to receive or transmit a second radio-frequency signal in a second band. In other words, the at least one radio-frequency signal generated by the metal element 120 includes the first radio-frequency signal and the second radio-frequency signal, and the impedance elements (e.g., the impedance elements 141 to 143) may be used to block the first radio-frequency signal and the second radio-frequency signal. Further, a length of the first edge 210 (i.e., a length of the first resonant path 230) is ¼ of a wavelength of a lowest frequency of the first band, and a length of the second edge 220 (i.e., a length of the second resonant path 240) is ¼ of a wavelength of a lowest frequency of the second band.

Figure 3:
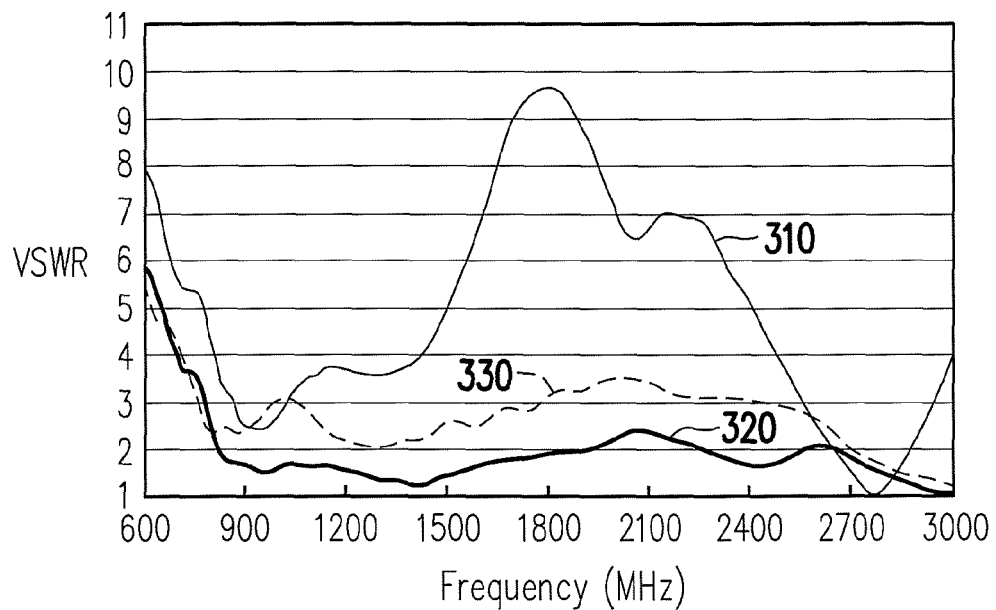
FIG. 3 is a voltage standing wave ratio diagram of the metal element according to an embodiment of the invention.

FIG. 3 is a voltage standing wave ratio (VSWR) diagram of the metal element according to an embodiment of the invention. A curve 310 refers to a voltage standing wave ratio when the impedance elements are not disposed between the battery 110 and the control circuit 130, a curve 320 refers to a voltage standing wave ratio when open circuit is present between the battery 110 and the control circuit 130, and a curve 330 refers to a voltage standing wave ratio when the impedance elements are disposed between the battery 110 and the control circuit 130. Further, in the embodiment of FIG. 3, a dimension of the metal element 120 is approximately 40×20 mm$^2$ and a volume of the battery 110 is approximately 86×45×5.6 mm$^3$.

In view of the curve 330 and the curve 320 in FIG. 3, it is obviously that, by disposing the impedance elements, surrounding environment of the metal element 120 may become approximate to the situation where open circuit is present between the battery 110 and the control circuit 130. Further, in view of the curve 330 and the curve 310, it is obviously that, by disposing the impedance elements, the radiation characteristic of the metal element 120 may be enhanced tremendously. For instance, as shown by the curve 330 in FIG. 3, the first band covered by the metal element 120 may be 1565 MHz, 1575 MHz and 1615 MHz bands which are used by, for example, a positioning system, whereas the second band covered by the metal element 120 may be 2400 MHz to 2483.5 MHz band which are used by, for example, the bluetooth communication standard. Further, both of the voltage standing wave ratios of the metal element 120 in the first band and the second band are approximately below 3.

In other words, by disposing the impedance elements, the battery 110 and the metal element 120 can share the same space. For instance, the battery 110 and the metal element 120 can be stacked with each other above the carrier 170, such that an area where the battery 110 is located may be used to form an antenna clearance area. Accordingly, it is not required to additionally dispose the antenna clearance area for the portable electronic device 10, so as to facilitate reducing the hardware space consumed by the metal element 120. Further, by disposing the impedance elements, the metal element 120 may further provide the preferable radiation characteristic, so as to facilitate development of the portable electronic device 10 in terms of the wearable technology.

Figure 4:
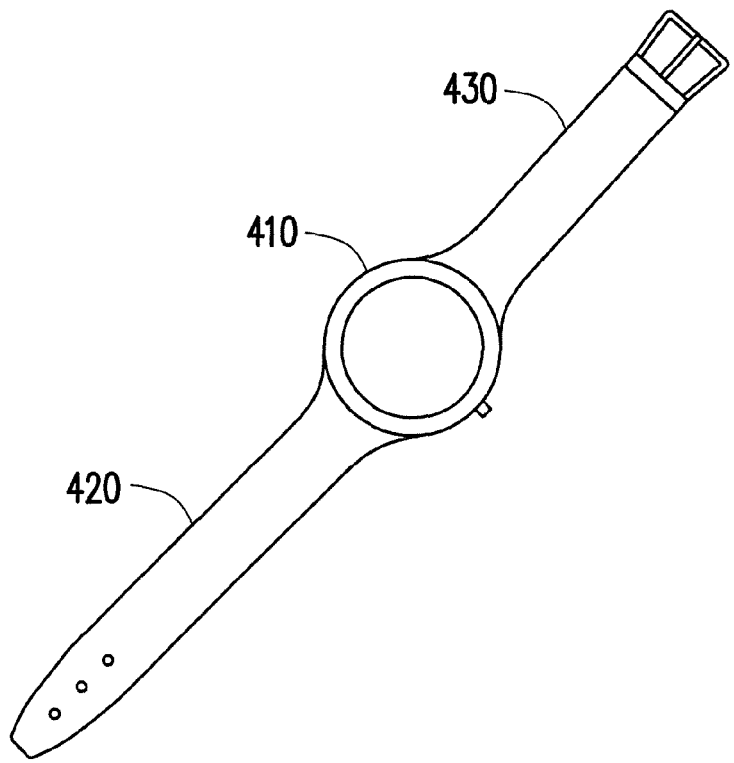
FIG. 4 is a schematic diagram of an external appearance of the portable electronic device according to an embodiment of the invention.

For instance, FIG. 4 is a schematic diagram of an external appearance of the portable electronic device according to an embodiment of the invention. As shown in FIG. 4, the portable electronic device 10 may be, for example, a smart watch, and an appearance structure of the portable electronic device 10 includes a watch body 410, a watch belt 420 and a watch belt 430. Specifically, the watch belt 420 and the watch belt 430 are connected to the watch body 410, and each includes a belt-shaped structure to facilitate wearing for users. In addition, the watch body 410 may be used to constitute a device body of the portable electronic device 10, and the substrate 180 depicted in FIG. 1 may be, for example, disposed in the device body (i.e., the watch body 410). Furthermore, the watch belt 420 may be used to constitute the carrier 170 of the portable electronic device 10. In other words, the battery 110 and the metal element 120 in FIG. 1 may be disposed in the carrier 170 (i.e., the watch belt 420), and the control circuit 130, the impedance elements (e.g., the impedance elements 141 to 143), the transceiver 150 and the matching circuit 160 in FIG. 1 may be disposed in the device body (i.e., the watch body 410).

In summary, multiple impedance elements are disposed between the control circuit and the battery in the portable electronic device of the invention. Further, the orthogonal projection of the metal element on the carrier is overlapped with the orthogonal projection of the battery on the carrier.

Accordingly, the hardware space consumed by the metal element may be reduced, and the metal element can have the good radiation characteristic. As a result, the portable electronic device can meet the application requirements in the wearable technology.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A portable electronic device, comprising:
   a battery, disposed in a carrier;
   a metal element, receiving a feeding signal through a feeding point, the metal element comprising a first resonant path to receive or transmit a first radio-frequency signal in a first band, a length of the first resonant path being ¼ of a wavelength of a lowest frequency of the first band, and an orthogonal projection of the metal element on the carrier being overlapped with an orthogonal projection of the battery on the carrier;
   a control circuit, configured to control the battery so that a plurality of operation signals are transmitted between the battery and the control circuit; and
   a plurality of impedance elements, electrically connected between the battery and the control circuit, and the impedance elements transmitting the operation signals and blocking the first radio-frequency signal.

2. The portable electronic device of claim 1, wherein the battery comprises a connector having a plurality of terminals one-to-one corresponding to the impedance elements, and each of the terminals is electrically connected to the control circuit through the corresponding impedance element.

3. The portable electronic device of claim 2, wherein each of the impedance elements is an inductor.

4. The portable electronic device of claim 2, wherein the battery further comprises a housing, and the metal element is attached on the housing.

5. The portable electronic device of claim 2, wherein the battery further comprises a housing, and the metal element is a part of the housing.

6. The portable electronic device of claim 2, wherein the metal element comprises a first edge and a second edge adjacent to each other, and the feeding point of the metal element is adjacent to an intersection of the first edge and the second edge.

7. The portable electronic device of claim 6, wherein a length of the first edge is ¼ of the wavelength of the lowest frequency of the first band.

8. The portable electronic device of claim 7, wherein the metal element further receives or transmits a second radio-frequency signal in a second band, and a length of the second edge is ¼ of a wavelength of a lowest frequency of the second band.

9. The portable electronic device of claim 8, wherein a shape of the metal element is a rectangle.

10. The portable electronic device of claim 1, further comprising:
    a transceiver, generating the feeding signal; and
    a substrate, having a ground plane, and the transceiver, the control circuit and the impedance elements being disposed on the substrate.

11. The portable electronic device of claim 10, further comprising:
    a matching circuit, disposed on the substrate, and electrically connected between the metal element and the transceiver so that an impedance of the matching circuit matches an impedance of the transceiver.

12. The portable electronic device of claim 11, further comprising:
    a device body, connected to the carrier, wherein the substrate is disposed in the device body, and the carrier has a belt-shaped structure.

\* \* \* \* \*